US012712231B2

(12) United States Patent
Lee et al.

(10) Patent No.: US 12,712,231 B2
(45) Date of Patent: Aug. 18, 2026

(54) BATTERY MODULE

(71) Applicant: SK On Co., Ltd., Seoul (KR)

(72) Inventors: Seung Hun Lee, Daejeon (KR); Hyeong Kwan Kang, Daejeon (KR); Kwan Yong Kim, Daejeon (KR); Sang Yeon Kim, Daejeon (KR); Dong Jin Shin, Daejeon (KR); Ung Ho Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 738 days.

(21) Appl. No.: 17/559,398

(22) Filed: Dec. 22, 2021

(65) Prior Publication Data

US 2022/0209352 A1 Jun. 30, 2022

(30) Foreign Application Priority Data

Dec. 29, 2020 (KR) ........................ 10-2020-0186311

(51) Int. Cl.
*H01M 50/262* (2021.01)
*H01M 50/209* (2021.01)
*H01M 50/526* (2021.01)

(52) U.S. Cl.
CPC ....... *H01M 50/262* (2021.01); *H01M 50/209* (2021.01); *H01M 50/526* (2021.01); *H01M 2220/20* (2013.01)

(58) Field of Classification Search
CPC ............. H01M 50/262; H01M 50/209; H01M 50/526; H01M 2220/20; H01M 50/249
See application file for complete search history.

(56) References Cited

U.S. PATENT DOCUMENTS

2010/0112424 A1 5/2010 Hayashi
2014/0011066 A1* 1/2014 Hoefler et al. ........ H01M 50/24 429/99

(Continued)

FOREIGN PATENT DOCUMENTS

CN 210467906 U * 5/2020 .......... H01M 50/262
EP 2752918 A1 7/2014

(Continued)

OTHER PUBLICATIONS

Chen et al., "CN210467906U English Translation", May 5, 2020.*

(Continued)

*Primary Examiner* — Matthew T Martin
*Assistant Examiner* — Alexandra J Simmons
(74) *Attorney, Agent, or Firm* — IP & T GROUP LLP

(57) ABSTRACT

A battery module includes a cell stack body in which a plurality of battery cells are stacked; and a module case accommodating the cell stack body therein having a first surface and a second surface, opposite to the first surface. The module case includes an upper case disposed on one side of the cell stack body; a lower case disposed on the other side of the cell stack body and coupled to the upper case; and a module fastening portion for coupling the battery module to an external structure, wherein the module fastening portion is disposed closer to the first surface of the module case than to the second surface of the module case, and wherein a case fastening portion coupling the upper case and the lower case together is disposed closer to the second surface of the module case than to the first surface of the module case.

15 Claims, 6 Drawing Sheets

(56) References Cited

U.S. PATENT DOCUMENTS

| | | | | |
|---|---|---|---|---|
| 2014/0212722 | A1* | 7/2014 | Lee et al. | H01M 50/211 429/99 |
| 2018/0175469 | A1* | 6/2018 | Salinas | H01M 10/625 |
| 2019/0081294 | A1* | 3/2019 | Capati et al. | H01M 50/293 |
| 2020/0067033 | A1 | 2/2020 | Sumida | |
| 2021/0359366 | A1 | 11/2021 | Chen et al. | |
| 2021/0391632 | A1 | 12/2021 | Kim et al. | |

FOREIGN PATENT DOCUMENTS

| | | | | |
|---|---|---|---|---|
| EP | 2755257 | A1 | 7/2014 | |
| JP | H10-146625 | A | 6/1998 | |
| JP | 6181096 | B2 | 8/2017 | |
| KR | 20190128812 | A * | 11/2019 | H01M 2/204 |
| WO | 2020/149704 | A1 | 7/2020 | |

OTHER PUBLICATIONS

Kim Kwan Yong, "KR 20190128812 A English Translation", Nov. 19, 2019.*

Extended European Search Report for European Patent Application No. 21216505.4 issued by the European Patent Office on May 24, 2022.

Extended European Search Report for the European Patent Application No. 21216505.4 issued by the European Patent Office on Sep. 9, 2022.

* cited by examiner

III-III'

BATTERY MODULE

CROSS-REFERENCE TO RELATED APPLICATION(S)

This application claims benefit of priority to Korean Patent Application No. 10-2020-0186311 filed on Dec. 29, 2020 in the Korean Intellectual Property Office, the disclosure of which is incorporated herein by reference in its entirety.

BACKGROUND

1. Field

The present disclosure relates to a battery module including a secondary battery.

2. Description of Related Art

Unlike primary batteries, secondary batteries may charge and discharge electrical energy. Thus, secondary batteries may be applied to devices within various fields, for example, in the areas of digital cameras, mobile phones, laptops, hybrid vehicles, and the like. Examples of secondary batteries may include nickel-cadmium batteries, nickel-metal hydride batteries, nickel-hydrogen batteries, lithium secondary batteries, and the like.

Among such secondary batteries, a large amount of research into lithium secondary batteries having a relatively high energy density and a relatively high discharge voltage is in progress. Recently, lithium secondary batteries have been manufactured as pouched battery cells having flexibility, and have been used in module or pack form by connecting a plurality of battery cells.

SUMMARY

An aspect of the present disclosure is to provide a battery module having ease of manufacturing.

According to an aspect of the present disclosure, a battery module includes a cell stack body in which a plurality of battery cells are stacked; and a module case accommodating the cell stack body therein and having a first surface and a second surface, opposite to the first surface, wherein the module case includes an upper case disposed on one side of the cell stack body; a lower case disposed on the other side of the cell stack body and coupled to the upper case; and a module fastening portion for coupling the battery module to an external structure, wherein the module fastening portion is disposed closer to the first surface of the module case than to the second surface of the module case, and wherein a case fastening portion coupling the upper case and the lower case together is disposed closer to the second surface of the module case than to the first surface of the module case.

In an embodiment of the present invention, wherein, a region between the first surface and the second surface of the module case is equally divided into two sub-regions, and the module fastening portion and the case fastening portion may be disposed in different sub-regions.

In an embodiment of the present invention, the battery module may further include a busbar assembly disposed between the cell stack body and the module case, and wherein a plurality of electrode leads from the plurality of battery cells are coupled to the busbar assembly.

In an embodiment of the present invention, the battery module may further include a fixing member passing through the module case and fastened to the busbar assembly.

In an embodiment of the present invention, the lowercase may include a lower plate disposed below the cell stack body, and a coupling plate disposed on a side surface of the cell stack body and coupled to the upper case, wherein the lower plate may have a through-hole into which the fixing member is inserted.

In an embodiment of the present invention, the lower plate may further include an insertion groove formed along a peripheral portion of the through-hole on an external surface of the lower plate, wherein a head portion of the fixing member may be entirely inserted into the insertion groove.

In an embodiment of the present invention, in the lower plate, a thickness of a portion in which the insertion groove is formed is smaller than a thickness of a portion in which the insertion groove is not formed.

In an embodiment of the present invention, an internal surface of the lower plate corresponding to the insertion groove may be formed to be planar.

In an embodiment of the present invention, the insertion groove may be formed by a forging process.

In an embodiment of the present invention, a clearance distance between the lower plate and each of the plurality of battery cells may be 2 mm or more.

In an embodiment of the present invention, a creepage distance between the lower plate and each of the plurality of battery cells may be 5 mm or more.

In an embodiment of the present invention, the lower case may include a lower plate disposed below the cell stack body, and a coupling plate disposed on a side surface of the cell stack body and coupled to the upper case, the upper case may include an upper plate disposed on the cell stack body, and a side plate disposed on the side surface of the cell stack body, wherein the fixing member may be coupled to the busbar assembly through the side plate and the coupling plate.

In an embodiment of the present invention, the fixing member may include a first fixing member passing through the upper case in an upper portion of the module case and coupled to the busbar assembly; a second fixing member passing through the upper case and the lower case together in a side portion of the module case and coupled to the busbar assembly; and a third fixing member passing through the lower case in a lower portion of the module case and coupled to the busbar assembly.

According to another aspect of the present disclosure, a battery module includes a cell stack body in which a plurality of battery cells are stacked; a module case accommodating the cell stack body therein and having a first surface and a second surface, opposite to the first surface; a busbar assembly disposed between the cell stack body and the module case, wherein electrode leads of the plurality of battery cells are coupled to the busbar assembly; and a fixing member passing through the module case and fastened to the busbar assembly, wherein the module case further includes a through-hole into which the fixing member is inserted, and an insertion groove formed along a peripheral portion of the through-hole on an external surface of the module case, wherein an internal surface of the module case corresponding to the insertion groove is formed to be planar.

According to another aspect of the present disclosure, a battery module includes a cell stack body including a plurality of battery cells, each battery cell having an electrode assembly inside a pouch and electrode leads passing through the pouch at opposite sides of the pouch, a busbar assembly coupled to the electrode leads; and a module case enclosing the cell stack body and the busbar assembly, wherein the module case includes an upper case, a lower case, and a case fastening unit coupling the upper and lower cases together, wherein the module case includes a module fastening unit for securing the battery module to an external structure; and wherein the module fastening unit and the case fastening unit are disposed on different regions of a lateral side of the module case.

In an embodiment of the present invention, the busbar assembly may include an insulating cover and a busbar, and the electrode leads of the battery cells pass through corresponding slits formed on the insulating cover to be interconnected outside the insulating cover with the busbar.

In an embodiment of the present invention, the insulating cover may be provided with a connection terminal for electrically connecting the battery cells to the outside.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
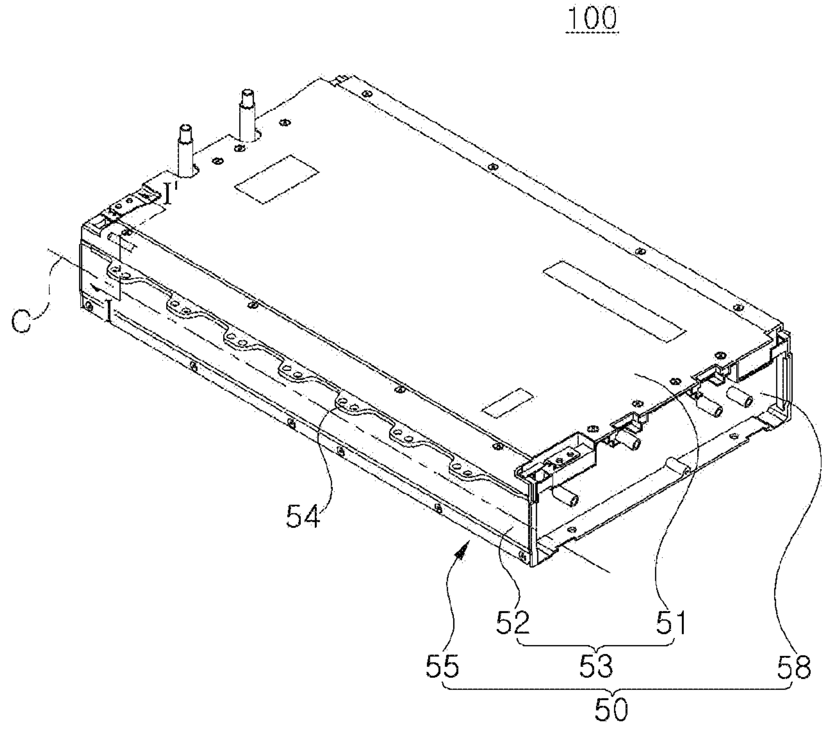
FIG. 1 is a perspective view schematically illustrating a battery module according to an embodiment of the present disclosure.

Hereinafter, embodiments of the present disclosure will be described with reference to the accompanying drawings. However, embodiment of the present disclosure may be modified in various other forms, and the scope of the present disclosure is not limited to embodiments described below.

In addition, embodiments of the present disclosure are provided in order to more completely explain the present disclosure to those of ordinary skill in the art. Accordingly, shapes and sizes of elements in the drawings may be exaggerated for a clearer description, and like elements indicated by the same reference numerals in the drawings are like elements.

Also, in describing the present disclosure, terms having a direction such as 'below,' 'lower,' 'on,' 'above,' 'upper,' 'upper end,' 'lower end,' and the like are referred to, based on the perspective view illustrated in FIG. 1.

Figure 2:
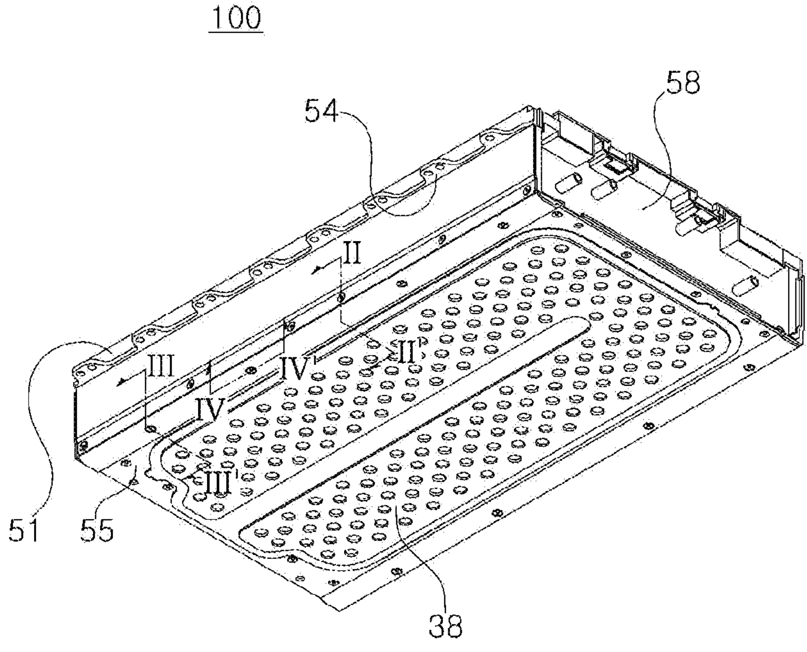
FIG. 2 is a bottom perspective view of the battery module illustrated in FIG. 1.
Figure 3:
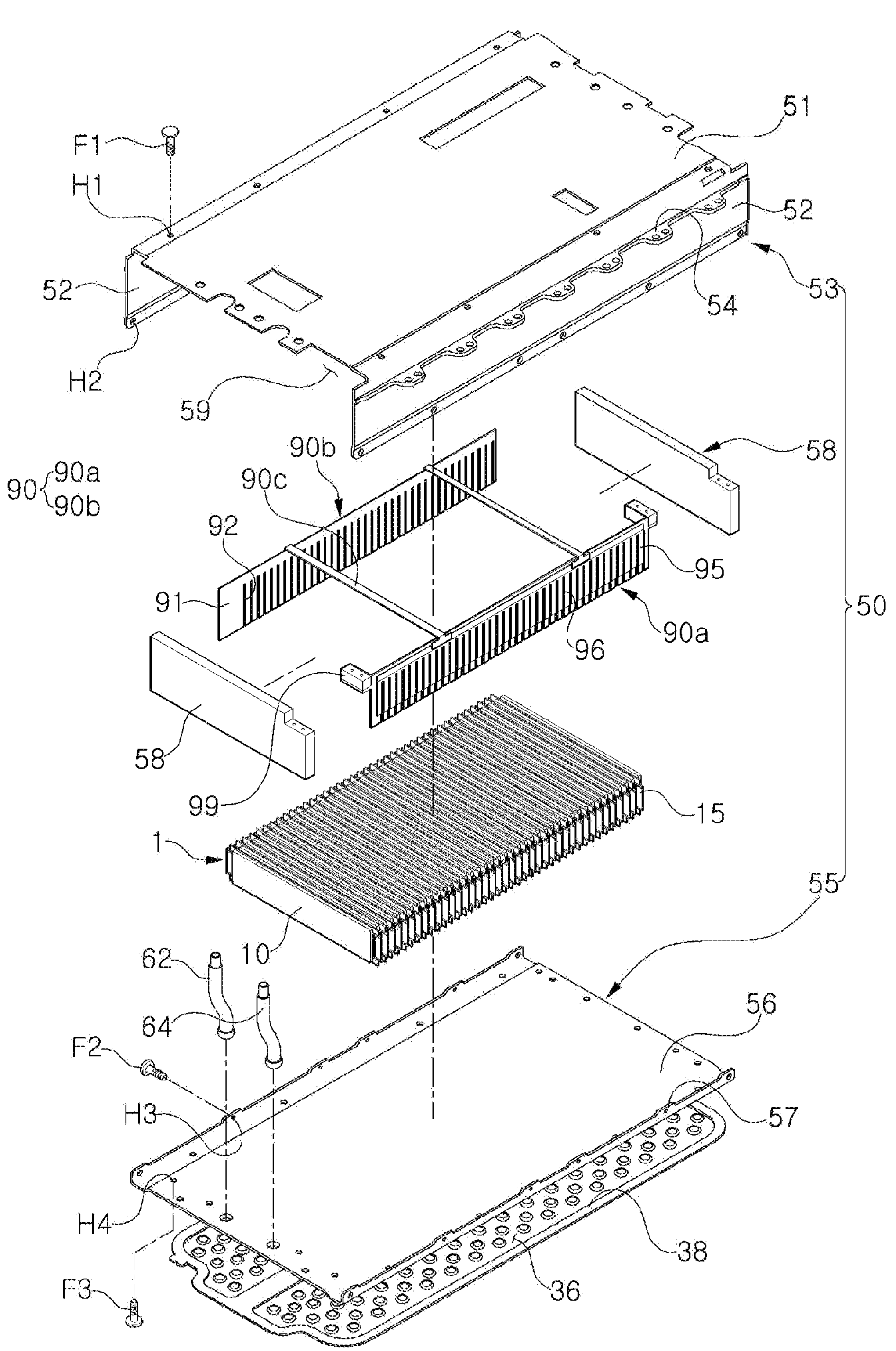
FIG. 3 is an exploded perspective view of the battery module illustrated in FIG. 2.

FIG. 1 is a perspective view schematically illustrating a battery module according to an embodiment of the present disclosure, FIG. 2 is a bottom perspective view of the battery module illustrated in FIG. 1, and FIG. 3 is an exploded perspective view of the battery module illustrated in FIG. 2. Also, FIG. 4 is a side view schematically illustrating the battery cell illustrated in FIG. 3.

Referring to FIGS. 1 to 4, a battery module 100 of the present embodiment may have a substantially hexahedral shape, and may include a cell stack body 1, a busbar assembly 90 electrically connected to the cell stack body 1, and a module case 50 protecting the cell stack body 1 from the outside. The module case 50 may enclose the cell stack body 1.

The cell stack body 1 may be formed by stacking a plurality of battery cells 10 side by side.

Figure 4:
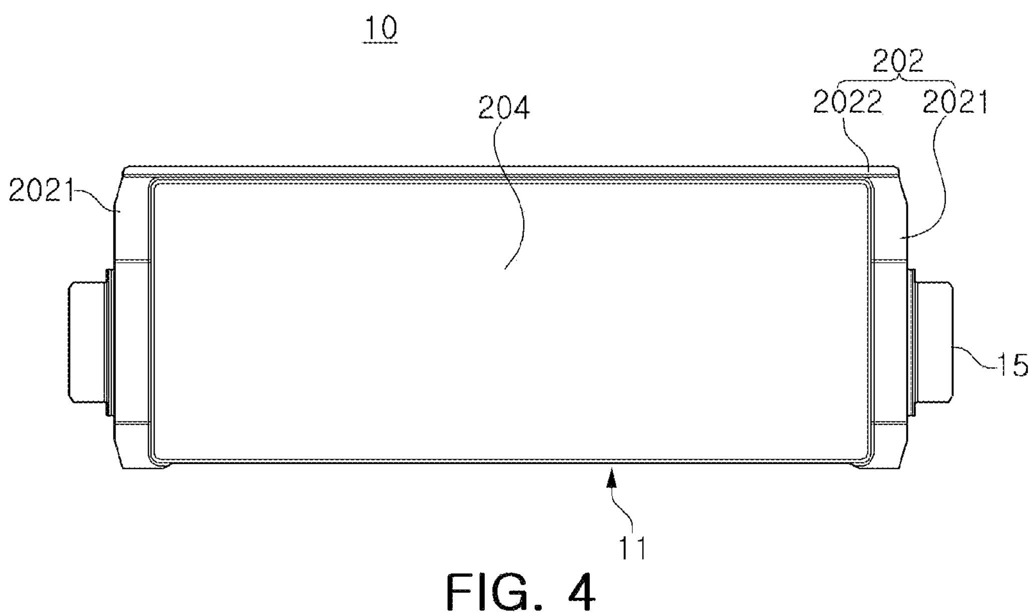
FIG. 4 is a side view schematically illustrating the battery cell illustrated in FIG. 3.

Each of the battery cells 10 may have a structure in which an electrode lead 15 protrudes from a body externally, as illustrated in FIG. 4. The battery cell 10 may be, for example, a pouched secondary battery.

The battery cell 10 may be configured in a form in which an electrode assembly is accommodated in a pouch 11.

The electrode assembly may be formed by stacking a plurality of positive electrode plates and a plurality of negative electrode plates. The plurality of positive plates and the plurality of negative plates may be provided with electrode tabs, respectively, and may be in contact with the same polarity with each other, to be connected to the same electrode lead 15.

In an embodiment of the present invention, two electrode leads 15 from each battery cell 10 may be arranged in opposite directions. However, the present disclosure is not limited thereto, and the two electrode leads 15 may be also arranged in the same direction.

The pouch 11 may be divided into a sealing portion 202 and an accommodating portion 204.

The accommodating portion 204 may be formed to have a container shape, to provide an internal space having a rectangular shape. The electrode assembly and electrolyte may be accommodated in the internal space of the accommodation portion 204.

The sealing portion 202 may refer to a portion sealed by bonding a portion with which the pouch of the battery cell 10 is in contact. Therefore, the sealing portion 202 may be disposed around the accommodating portion 204, and may be formed to have a flange shape extending outwardly from the accommodating portion 204. A method such as a thermal fusion process, an ultrasonic fusion process, or the like, may be used for bonding the sealing portion 202, but is not limited thereto.

In an embodiment of the present invention, the sealing portion 202 may be divided into a first sealing portion 2021 in which the electrode lead 15 is disposed, and a second sealing portion 2022 in which the electrode lead 15 is not disposed.

In an embodiment of the present invention, the pouch 11 may be manufactured by forming a piece of exterior material. More specifically, after forming one or two accommodating portions on an exterior material, the exterior material may be folded, such that the accommodating portions forma space (i.e., the accommodating portion), to manufacture the pouch 11.

In an embodiment of the present invention, the accommodating portion 204 may be formed in a hexahedral shape. In addition, the sealing portion 202 formed by bonding the exterior material may be provided on an external side of the accommodating portion 204. Therefore, in the battery cell 10 of the present embodiment, it is not necessary to form the sealing portion 202 on a surface on which the exterior material is folded. Therefore, in an embodiment of the present invention, the sealing portion 202 may be provided only on three surfaces, among four surfaces forming the external side of the accommodating portion 204, and no sealing portion may be disposed on one surface (a lower surface in FIG. 4) of the external side of the accommodating portion 204.

In an embodiment of the present invention, since the electrode leads 15 are disposed in opposite directions, two electrode leads 15 may be disposed on the sealing portions 202 formed on different sides. Therefore, the sealing portion 202 of the present embodiment may include two first sealing portions 2021 in which the electrode leads 15 are disposed, and one second sealing portion 2022 in which the electrode leads 15 are not disposed.

In addition, the battery cell 10 of the present embodiment may be configured to have the sealing portion 202 folded at least once, to increase bonding reliability of the sealing portion 202 and minimize a volume occupied by the sealing portion 202 in the battery module 10.

The battery cell 10 configured as described above may generate a current as a nickel metal hydride (Ni-MH) battery or a lithium ion (Li-ion) battery, capable of charging and discharging electrical energy. In addition, the battery cell 10 may be vertically erected in the module case 50 to be described later, and may be stacked in a left-right direction.

The plurality of battery cells 10 may be stacked in parallel to face relatively wide surfaces thereof each other, as compared to the other surfaces. For example, the battery cells 10 may be vertically erected and stacked in the left-right direction (or a horizontal direction). However, the present disclosure is not limited thereto, and may be configured to be stacked in a vertical direction.

The module case 50 may define an external appearance of the battery module 100, and may be disposed outside the plurality of battery cells 10 to protect the battery cells 10 from an external environment.

The module case 50 may surround the cell stack body 1, and may include a lower case 55 disposed on a lower portion of the cell stack body 1, an upper case 53 disposed on an upper portion of the cell stack body 1, and a side cover 58 disposed on a side portion of the cell stack body 1. The side cover 58 may include first and second side covers 58 covering opposite side portions of the cell stack body 1.

The upper case 53 may include an upper plate 51 disposed on the cell stack body 1, and a side plate 52 disposed on the side portion of the cell stack body 1. In an embodiment of the present invention, the side plate 52 and the upper plate 51 may be integrally configured. For example, one plate material may be bent to form the side plate 52 and the upper plate 51.

The side plate 52 may be formed to include a left and a right side plate 52 extending from both sides of the upper plate 51 to be disposed on both side portions of the cell stack body 1. As illustrated in FIG. 3, in an embodiment of the present invention, the battery cells 10 are arranged such that the electrode leads 15 face the side plates 52. Therefore, the busbar assembly 90 may be electrically connected to the electrode leads 15 and may be disposed between the side plates 52 and the battery cells 10.

The upper case 53 may be formed of a material having high thermal conductivity, such as metal. For example, the upper case 53 may be formed of an aluminum material. However, the present disclosure is not limited thereto, and various materials may be used as long as the materials have similar strength and thermal conductivity, even when they are not a metal.

In an embodiment of the present invention, the upper case 53 may be provided with a module fastening portion 54 in a region in which the side plate 52 and the upper plate 51 meet.

The module fastening portion 54 may be a portion coupled to an external structure such as a vehicle or the like, when, for example, the battery module 100 is mounted to an external structure.

The battery module 100 may be coupled to the external structure through a separate fastening member such as a bolt, a nut, or the like, and the module fastening portion 54 may be thus provided with a hole into which the fastening member is inserted.

In an embodiment of the present invention, the module fastening portion 54 may be formed to protrude outwardly in parallel with the upper plate 51 from a position of the side plates 52 adjacent to the upper plate 51. However, the present disclosure is not limited thereto, and the module fastening portion 54 may be modified to have various forms as long as it may be fastened to the above-described external structure. For example, the module fastening portion 54 may be disposed on the same plane as the upper plate 51.

In addition, the module case 50 may include a first surface (e.g., an upper surface or top surface) and a second surface (e.g., a lower surface or a bottom surface), and in an embodiment of the present invention, the module fastening portion 54 may be disposed to be closer to the first surface of the module case 50 than to the second surface of the module case 50, and a fastening portion 70 (referring to FIG. 6, hereinafter, a case fastening portion) coupling the upper case 53 and the lower case 55 together is disposed closer to the second surface of the module case 50 than to the first surface of the module case 50. In this case, the second surface of the module case 50 may mean an opposite surface of the first surface of the module case 50.

Specifically, as illustrated in FIG. 1, when a region between the first and second surfaces of the module case 50 in a longitudinal direction of the battery module 100 is equally divided into two sub-regions, the module fastening portion 54 and the case fastening portion 70 may be disposed in different sub-regions.

Since the battery module 100 of the present embodiment may be mounted on an external structure such as a vehicle or the like through the module fastening portion 54, when an external force is applied to the external structure, the applied external force may be transferred to the battery module 100 through the module fastening portion 54.

Therefore, when the case fastening portion 70 is disposed adjacent to the module fastening portion 54, most of the external force applied to the module fastening portion 54 may be transferred to the case fastening portion 70, such that a portion in which the upper case 53 and the lower case 55 are coupled may be easily damaged.

Therefore, the module case 50 of the present embodiment may arrange the module fastening portion 54 and the case fastening portion 70 in a different region, to arrange the module fastening portion 54 and the case fastening portion 70 to be spaced apart from each other as much as possible, with respect to a center line C bisecting a region between the first and second surfaces of the module case 50 as described above.

Therefore, even when an external force is applied to the module fastening portion 54, transmission of the external force to the case fastening portion 70 may be minimized to suppress damage to the case fastening portion 70 by the external force.

Figure 5:
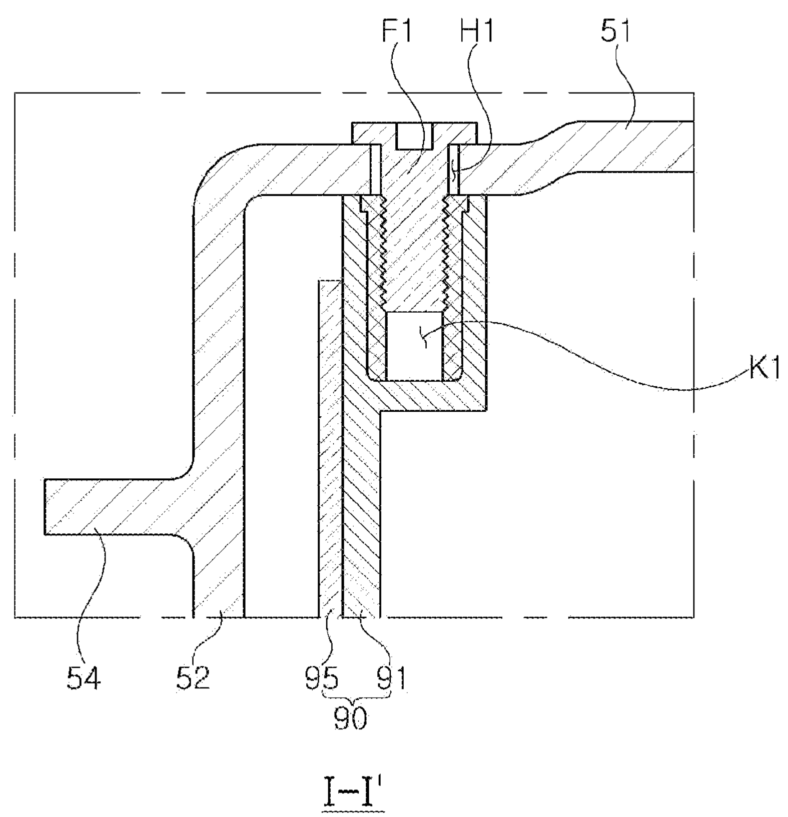
FIG. 5 is a partial cross-sectional view of FIG. 1, taken along line I-I'.
Figure 6:
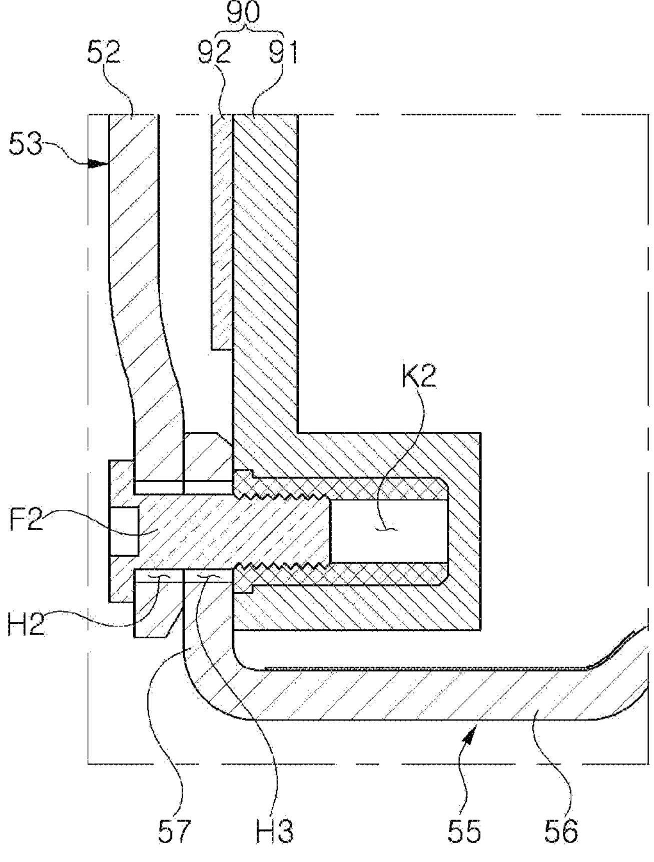
FIG. 6 is a partial cross-sectional view of FIG. 2, taken along II-II'.
Figure 7:
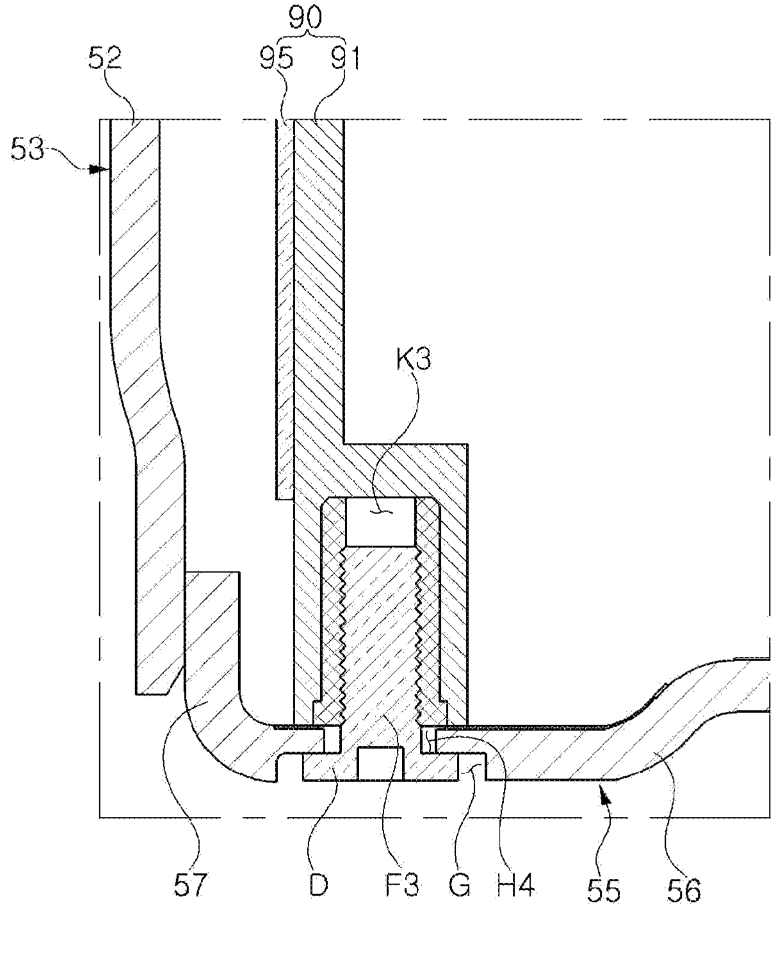
FIG. 7 is a partial cross-sectional view of FIG. 2, taken along line III-III'.
Figure 8:
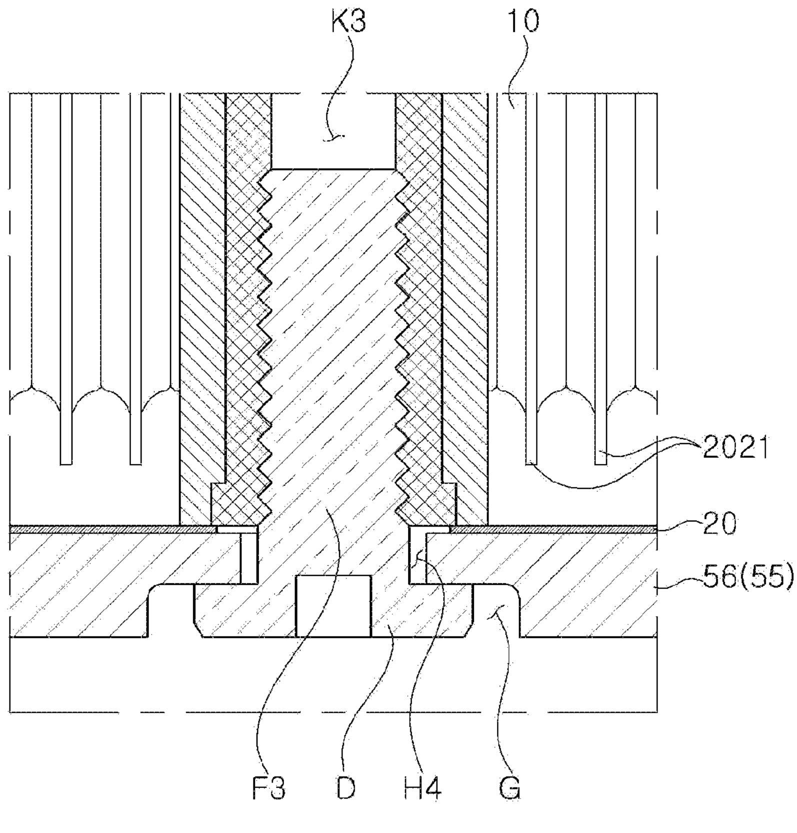
FIG. 8 is a partial cross-sectional view of FIG. 2, taken along IV-IV'.

FIG. 5 is a partial cross-sectional view of FIG. 1, taken along line I-I', FIG. 6 is a partial cross-sectional view of FIG. 2, taken along FIG. 7 is a partial cross-sectional view of FIG. 2, taken along line and FIG. 8 is a partial cross-sectional view of FIG. 2, taken along IV-IV'.

Referring to FIGS. 5 to 8, in an embodiment of the present invention, the module case 50 may be coupled to the busbar assembly 90 through fixing members F1, F2, and F3. Also, the upper case 53 and the lower case 55 may be coupled to each other by the busbar assembly 90.

In an embodiment of the present invention, the fixing members F1, F2, and F3 may include a first fixing member F1 passing through the upper case 53 in an upper portion of the module case 50 and coupled to the busbar assembly 90, a second fixing member F2 passing through the upper case 53 and the lower case 55 together in a side portion of the module case 50 and coupled to the busbar assembly 90, and a third fixing member F3 passing through the lower case 55 in a lower portion of the module case 50 and coupled to the busbar assembly 90.

Therefore, the upper case 53 may include a first through-hole H1 into which the first fixing member F1 is inserted and a second through-hole H2 into which the second fixing member F2 is inserted.

The first fixing member F1 may pass through the first through-hole H1, and may be coupled to the busbar assembly 90, to fix and fasten the busbar assembly 90 to the upper plate 51.

Similarly, the lower case 55 may include a third through-hole H3 into which the second fixing member F2 is inserted and a fourth through-hole H4 into which the third fixing member F3 is inserted.

The lower case 55 may be disposed on a lower portion of the cell stack body 1 to support lower surfaces of the battery cells 10. The lower case 55 may be fastened to a lower end of the side plate 52 of the upper case 53. When the lower case 55 is fastened to the upper case 53, the upper case 53 and the lower case 55 may have a tubular member having an empty internal space.

At least a portion of the lower case 55 may be disposed to overlap the side plate 52.

Referring to FIGS. 2 and 6, the lower case 55 of the present embodiment may include a lower plate 56 disposed below the cell stack body 1 to form a bottom surface of the module case 50, and a coupling plate 57 extending from both sides of the lower plate 56 and disposed parallel to the side plate 52. The coupling plate 57 may include left and right coupling plates 57 extending from respective opposite sides of the lower plate 56.

The coupling plate 57 may be disposed on a side surface of the cell stack body 1 such that one side thereof is in contact with the side plate 52. According to the present embodiment as illustrated in the figures, the coupling plate 57 is shown to be configured to contact an internal surface of the side plate 52, as an example. It is noted, however, that the present disclosure is not limited thereto, and the coupling plate 57 may be configured to contact an external surface of the side plate 52.

The lower plate 56 and the coupling plate 57 may be integrally configured. For example, one plate material may be bent to form the lower plate 56 and the coupling plate 57. However, the present disclosure is not limited thereto.

Like the upper case 53, the lower case 55 may be formed of a material having high thermal conductivity, such as metal. For example, the lower case 55 may be formed of the same material as the upper case 53, but is not limited thereto.

The side plate 52 and the coupling plate 57 may be coupled through the second fixing member F2. Therefore, the above-described case fastening portion 70 may refer to a portion in which the second fixing member F2 passes through the side plate 52 and the coupling plate 57 and is then coupled to the busbar assembly 90 inside the module case 50. Therefore, when the second fixing member F2 is coupled to the busbar assembly 90, the coupling plate 57 may be disposed between the side plate 52 and the busbar assembly 90 to be fixed and fastened to the side plate 52.

To this end, the side plate 52 and the coupling plate 57 may be provided with the second and third through-holes H2 and H3 into which the second fixing member F2 is inserted, respectively.

However, the configuration of the present disclosure is not limited thereto, and various modifications may be carried out. For example, the upper case 53 and the lower case 55 may be coupled in a sliding manner or joined together by welding or the like.

The third fixing member F3 may pass through the fourth through-hole H4 of the lower plate 56, and may be coupled to the busbar assembly 90. Therefore, a plurality of fourth through-holes H4 may be spaced apart from each other along a region of the lower plate 56 facing the busbar assembly 90 to be described later.

The fourth through-hole H4 may include an insertion groove G.

The insertion groove G may be formed as a space in which a head portion D of the third fixing member F3 is accommodated. In an embodiment of the present invention, the head portion D of the third fixing member F3 may be entirely inserted into the insertion groove G. Therefore, the insertion groove G may have a depth equal to or greater than a thickness of the head portion D of the third fixing member F3, and may be formed as a groove having an area (or a diameter), larger than an area (or a diameter) of the head portion D.

In an embodiment of the present invention, the third fixing member F3 may pass through the fourth through-hole H4 from the outside of the module case 50, and may be fastened to the module case 50. Therefore, the insertion groove G may be disposed on an external surface of the lower plate 56.

As illustrated in FIG. 8, an insulating member 20 may be inserted between the lower plate 56 and the first sealing portion 2021 of the battery cell 10. Therefore, the insulating member 20 may be coupled to the lower plate 56 along a path in which the plurality of fourth through-holes H4 are disposed.

The insulating member 20 may be formed of an electrically insulating material such as resin or rubber, to ensure insulation between the lower plate 56 and the first sealing portion 2021.

In an embodiment of the present invention, the insertion groove G may be formed to reduce a thickness of the lower plate 56. Therefore, the lower plate 56 may be formed such that a thickness of a portion in which the insertion groove G is formed is thinner than a thickness of the other portion.

In this case, an internal surface of the lower plate 56 may be formed to be planar, without protruding a portion corresponding to the insertion groove G. For example, even when the insertion groove G is formed, the internal surface of the lower plate 56 may be formed to be planar without deformation thereof due to the insertion groove G, in a similar manner to the other through-holes H1, H2, and H3 having no insertion groove G.

Unlike the present embodiment, when a portion of the internal surface of the lower plate 56, corresponding to the insertion groove G, protrudes, the protruding portion may protrude toward the battery cell 10. Therefore, an interval between the battery cell 10 and the protruding portion may be shorter than an interval between the battery cell 10 and the other portion thereof.

This will be described in more detail as follows.

Since the fourth through-hole H4 may be disposed along a region facing the busbar assembly 90, in the battery cell 10 accommodated in the module case 50, a lower end of the first sealing portion 2021 may be disposed most adjacent to the fourth through-hole H4.

The sealing portion 202 of the battery cell 10 may be formed by bonding the pouch 11, and may thus have weaker insulation property than that of other portions. In addition, in an embodiment of the present invention, the third fixing member F3 may pass through the insulating member 20 and may be fastened to the busbar assembly 90. Therefore, even though the insulating member 20 is provided, when a portion of the internal surface of the lower plate 56 corresponding to the insertion groove G is formed to protrude, it may be difficult to secure an insulating distance between the lower plate 56 and the battery cell 10.

Therefore, when the above-described protruding portion is formed on the lower plate 56, since a distance between the first sealing portion 2021 and the lower plate 56 may be too short, it may be difficult to obtain insulation reliability between the battery cell 10 and the module case 50.

The module case 50 of the present embodiment may be provided with an insertion groove G, and a portion of the internal surface of the lower plate 56 corresponding to the insertion groove G may be formed to be planar without protruding.

Therefore, since intervals between the lower plate 56 and the battery cells may be uniformly formed as a whole, even though the insertion groove G is provided, insulation reliability between the battery cells and the module case 50 may be secured.

In the present embodiment, a clearance distance between the lower plate 56 and the battery cell may be formed to be 2 mm or more. In addition, a creepage distance between the lower plate 56 and the battery cell may be formed to be 5 mm or more. This may be according to a case in which a voltage of a battery module system (e.g., a battery pack) is 500V, and when a voltage corresponding thereto is changed, a clearance or creepage distance thereof may also be changed.

The insertion groove G of the present embodiment may be formed by a forging process. For example, after the fourth through-hole H4 is first formed in the lower plate 56, the insertion groove G of the present embodiment may be formed by mounting an internal surface of the lower plate 56 on a planar bottom such as a surface plate, and striking a peripheral portion of the fourth through-hole H4 in the external surface of the lower plate 56.

However, the configuration of the present disclosure is not limited thereto, and various modifications such as forming the insertion groove G may be carried out by removing the peripheral portion of the fourth through-hole H4 by a cutting process or the like.

In an embodiment of the present invention, a case in which the insertion groove G is formed only in the fourth through-hole H4 is illustrated. This may be to prevent the head portion of the fixing member from protruding from a lower surface of the battery module. Therefore, the configuration of the present disclosure is not limited thereto, and the insertion grooves G may be formed in the first and second through-holes H1 and H2.

The side cover 58 may be respectively coupled to both ends of a tubular member coupling the upper case 53 and the lower case 55 together.

The side cover 58 may be provided with a terminal hole 59 exposing a connection terminal 99, and may be formed of a material having rigidity. For example, the side cover 58 may be formed of an insulating material such as resin or a conductive material such as a metal.

The side cover 58 may be coupled to the lower case 55 and the upper case 53 through fixing members such as bolts or screws, or by an adhesive welding process or the like, but is not limited thereto.

The busbar assembly 90 may be disposed on a side surface on which the electrode leads 15 of the battery cell 10 are disposed, among side surfaces of the cell stack body 1, to be coupled to the electrode leads 15.

The busbar assembly 90 of the present embodiment may include an insulating cover 91 and a busbar 95.

The electrode leads 15 of the battery cells 10 may pass through the insulating cover 91 to be interconnected outside the insulating cover 91. To this end, the insulating cover 91 may be provided with a plurality of first slits 92 into which the electrode leads 15 are inserted.

In addition, the insulating cover 91 may be provided with the connection terminal 99 for electrically connecting the battery cells 10 to the outside. The connection terminal 99 may be exposed to the outside through the terminal hole 59 formed in the module case 50. Therefore, the terminal hole 59 of the module case 50 may be formed to have a shape corresponding to a size and an external shape of the connection terminal 99.

In an embodiment of the present invention, the connection terminal 99 may be formed as a conductive member, and may be electrically connected to at least one busbar 95.

The busbar 95 may be formed as a metal plate, and may be configured to be coupled to an external surface of the insulating cover 91, or embed at least a portion thereof in the insulating cover 91. The battery cells 10 may be electrically connected to each other through the busbar 95, and may be electrically connected to an external element of the battery module 100 through the busbar 95 and the connection terminal 99.

To this end, a plurality of second slits 96 into which the electrode leads 15 are inserted may be provided in the busbar 95. The second slits 96 may be disposed in a position corresponding to the first slits 92. Therefore, the electrode leads 15 may be inserted into and disposed in the busbar assembly 90, to pass through a pair of a first slit 92 and a corresponding second slit 96 together. To this end, a plurality of the first slits 92 and a plurality of the second slits 96 may be spaced apart from each other in parallel, in response of the number of the battery cells 10.

After being inserted into the second slit 96 of the busbar 95, the electrode leads 15 may be joined to the busbar 95 by a welding process or the like.

As illustrated in FIG. 3, the busbar assembly 90 of the present embodiment may include a first busbar assembly 90*a* and a second busbar assembly 90*b*.

The first busbar assembly 90*a* may be coupled to one side of the cell stack body 1, and the second busbar assembly 90*b* may be coupled to an opposite other side of the cell stack body 1. In this case, the one side and the other side of the cell stack body 1 may refer to both sides of the cell stack body 1 on which the electrode leads 15 are disposed.

In this case, the first busbar assembly 90*a* and the second busbar assembly 90*b* may be electrically connected to each other by a connecting member 90*c*. A flexible printed circuit board (FPCB) may be used as the connecting member 90_c_. However, the present disclosure is not limited thereto.

In addition, the busbar assembly 90 of the present embodiment may include a first fastening hole K1 to which the first fixing member F1 is coupled, a second fastening hole K2 to which the second fixing member F2 is coupled, and a third fastening hole K3 to which the third fixing member F3 is coupled.

Therefore, the first, second, and third fastening holes K1, K2, and K3 may be disposed to correspond to positions at which the first, second, and third fixing members F1, F2, and F3 are coupled. Threads to which the first, second, and third fixing members F1, F2, and F3 are screwed may be provided in the first, second, and third fastening holes K1, K2, and K3. For example, a nut may be inserted into the first, second, and third fastening holes K1, K2, and K3.

The battery module of the present embodiment may further include a cooling flow path 36.

Referring to FIG. 2, a flow path plate 38 may be coupled to the external surface of the lower plate 56.

The flow path plate 38 may be bonded to a lower surface of the lower plate 56, i.e., the external surface of the lower plate 56. In this case, the flow path plate 38 may not be entirely bonded, but only a portion thereof, and at least a portion of unbonded portions may be disposed to be spaced apart from the lower plate 56. A space between the lower plate 56 and the flow path plate 38 formed by this may be used as the cooling flow path 36.

The cooling flow path 36 may be entirely disposed inside the flow path plate 38, and may be modified to have various shapes. The flow path plate 38 may be manufactured by pressing a metal plate on the external surface of the lower plate 56, however, the invention is not limited thereto and any other suitable method may be employed.

In an embodiment of the present invention, an inlet 62 and an outlet 64 of the cooling flow path 36 may be provided on one side of the lower plate 56. Therefore, cooling water may be introduced into the cooling flow path 36 through the inlet 62, may be passed through the cooling flow path 36, and may then be discharged outside the cooling flow path 36 through the outlet 64.

However, the configuration of the present disclosure is not limited thereto, and as necessary, various modifications are possible, for example, the outlet 64 and the inlet 62 may be disposed on the flow path plate 38 or distributed on the flow path plate 38 and the lower plate 56, respectively, or the like.

In a battery module according to the present embodiment configured as described above, since a fastening unit of an upper case and a lower case may be spaced apart from a module fastening portion by a certain distance, even though an external force is applied to a module fastening portion, transfer of an external force to the fastening unit may be minimized. Therefore, it is possible to prevent the fastening portion from being easily damaged by an external force.

In addition, even though a fixing member is coupled to a lower surface of a lower case, an internal surface of the lower case, corresponding thereto, may be formed to be planar. Therefore, a separation distance between the lower case and the battery cell may be uniformly maintained, to secure insulation reliability between the battery cell and the module case.

According to the embodiment of the present disclosure, even when an external force is applied to a battery module, damage to a fastening portion of an upper case and a fastening portion of a lower case may be inhibited.

While example embodiments have been illustrated and described above, it will be apparent to those skilled in the art that modifications and variations could be made without departing from the scope of the present disclosure as defined by the appended claims.

What is claimed is:

1. A battery module comprising:

a cell stack body in which a plurality of battery cells are stacked; and a module case accommodating the cell stack body therein and having a first surface and a second surface, opposite to the first surface, wherein the module case comprises:

an upper case disposed on the cell stack body;

a lower case disposed below the cell stack body and coupled to the upper case; and a module fastening portion for coupling the battery module to an external structure, wherein the module fastening portion is disposed on both side surfaces of the cell stack body and is disposed closer to the first surface of the module case than to the second surface of the module case, wherein the lower case comprises a lower plate disposed below the cell stack body, and a coupling plate disposed on both side surfaces of the cell stack body and coupled to the upper case, wherein the upper case comprises an upper plate disposed on the cell stack body, and a side plate disposed on both side surfaces of the cell stack body, wherein a case fastening portion, which is a portion in which a side fixing member is coupled to a busbar assembly through both the side plate and the coupling plate, is disposed closer to the second surface of the module case than to the first surface of the module case, and wherein in the case fastening portion, the coupling plate is disposed to overlap the side plate, and wherein the side fixing member penetrates an overlapped portion of the coupling plate and the side plate to be coupled to the busbar assembly.

2. The battery module of claim 1, wherein, a region between the first surface and the second surface of the module case is equally divided into two sub-regions, and the module fastening portion and the case fastening portion are disposed in different sub-regions.

3. The battery module of claim 1, wherein the busbar assembly disposed between the cell stack body and the module case, and wherein a plurality of electrode leads from the plurality of battery cells are coupled to the busbar assembly.

4. The battery module of claim 3, further comprising a fixing member passing through the lower plate or upper plate and fastened to the busbar assembly.

5. The battery module of claim 4, wherein the lower plate has a through-hole into which the fixing member is inserted.

6. The battery module of claim 5, wherein the lower plate further comprises an insertion groove formed along a peripheral portion of the through-hole on an external surface of the lower plate, wherein a head portion of the fixing member is entirely inserted into the insertion groove.

7. The battery module of claim 6, wherein, in the lower plate, a thickness of a portion in which the insertion groove is formed is smaller than a thickness of a portion in which the insertion groove is not formed.

8. The battery module of claim 6, wherein an internal surface of the lower plate corresponding to the insertion groove is formed to be planar.

9. The battery module of claim 7, wherein the insertion groove is formed by a forging process.

10. The battery module of claim 8, wherein a clearance distance between the lower plate and each of the plurality of battery cells is 2 mm or more.

11. The battery module of claim 8, wherein a creepage distance between the lower plate and each of the plurality of battery cells is 5 mm or more.

12. The battery module of claim 4, wherein the fixing member comprises:

a first fixing member passing through the upper case in an upper portion of the module case and coupled to the busbar assembly; and a second fixing member passing through the upper case and the lower case together in a side portion of the module case and coupled to the busbar assembly.

13. A battery module comprising:

a cell stack body including a plurality of battery cells, each battery cell having an electrode assembly inside a pouch and electrode leads passing through the pouch at opposite sides of the pouch, a busbar assembly coupled to the electrode leads; and a module case enclosing the cell stack body and the busbar assembly, wherein the module case includes an upper case, a lower case, and a case fastening portion disposed on both lateral sides of module case and coupling the upper and lower cases together, wherein the lower case comprises a lower plate disposed below the cell stack body, and a coupling plate disposed on both lateral sides of the cell stack body and coupled to the upper case, wherein the upper case comprises an upper plate disposed on the cell stack body, and a side plate disposed on both lateral sides of the cell stack body, wherein in the case fastening portion, the coupling plate is disposed to overlap the side plate, wherein a side fixing member penetrates an overlapped portion of the coupling plate and the side plate to be coupled to the busbar assembly, wherein the module case includes a module fastening portion disposed on both lateral sides of module case for securing the battery module to an external structure, and wherein in each of the lateral sides, the module fastening portion and the case fastening portion, which is a portion where the side fixing member is coupled to the busbar assembly through both the side plate and the coupling plate, are disposed on different regions.

14. The battery module of claim 13, wherein the busbar assembly includes an insulating cover and a busbar, wherein the electrode leads of the battery cells pass through corresponding slits formed on the insulating cover to be interconnected outside the insulating cover with the busbar.

15. The battery module of claim 14, wherein the insulating cover is provided with a connection terminal for electrically connecting the battery cells to the outside.

* * * * *